United States Patent
Henderson (10) Patent No.: US 9,648,863 B2
(45) Date of Patent: May 16, 2017

(54) APPARATUS, SYSTEM AND METHOD FOR MECHANICAL, SELECTIVE WEED CONTROL IN MATURE AND ESTABLISHING CROPS INCLUDING TURFGRASSES

(71) Applicant: Jason Jeffrey Henderson, Colchester, CT (US)

(72) Inventor: Jason Jeffrey Henderson, Colchester, CT (US)

(*) Notice: Subject to any disclaimer, the term of this patent is extended or adjusted under 35 U.S.C. 154(b) by 0 days.

(21) Appl. No.: 14/601,574

(22) Filed: Jan. 21, 2015

(65) Prior Publication Data
US 2015/0201607 A1    Jul. 23, 2015

Related U.S. Application Data (60) Provisional application No. 61/929,607, filed on Jan. 21, 2014.

(51) Int. Cl.
*A01G 1/12* (2006.01)
*A01M 21/02* (2006.01)

(52) U.S. Cl.
CPC .............. *A01M 21/02* (2013.01); *A01G 1/12* (2013.01)

(58) Field of Classification Search
CPC .......... A01G 1/002; A01G 1/12; A01G 1/125; A01M 21/00; A01M 21/02; A01B 41/00;
(Continued)

(56) References Cited

U.S. PATENT DOCUMENTS

| 56,256 | A | * | 7/1866 | Olstead | ................... E01H 1/056 |
|---|---|---|---|---|---|
| | | | | | 15/179 |
| 159,025 | A | * | 1/1875 | Edson | ..................... E01H 1/056 |
| | | | | | 15/182 |

(Continued)

FOREIGN PATENT DOCUMENTS

| CA | 2619319 A1 | 1/2007 |
|---|---|---|
| CN | 1330229 C | 8/2007 |

(Continued)

OTHER PUBLICATIONS

Cousins, David; CombCut finds mainstream users; Farmer's Weekly; Jun. 26, 2013; <http://www.fwi.co.uk/machinery/combcut-finds-mainstream-users.htm>.*

(Continued)

*Primary Examiner* — Monica Williams
*Assistant Examiner* — Michael A Fabula
(74) *Attorney, Agent, or Firm* — Hahn Loeser & Parks, LLP (57) ABSTRACT

An apparatus for applying a desired amount of mechanical abrasion to plants is provided. The apparatus includes a base, a brush and an elevation device for maintaining the base at desirable height. The base has a first longitudinal axis and a plurality of grooves, the grooves being oriented approximately perpendicular to the first longitudinal axis. The brush has a second longitudinal axis and a plurality of bristles and/or blades extending outwardly from the second longitudinal axis. The brush is attached to the apparatus such that the second longitudinal axis is substantially parallel to the first longitudinal axis and the brush is rotatable about the second longitudinal axis. The brush is spaced from the base such that the plurality of bristles engage the plurality of grooves. The base is adjustable enabling the operator to (Continued)

move the base closer or further from the rotating brush/blades.

22 Claims, 7 Drawing Sheets

(58) Field of Classification Search
CPC ........... A01B 41/04; A01B 45/00; E01H 1/02; E01H 1/04; E01H 1/05; E01H 5/092; E01H 12/00; E01H 15/006
See application file for complete search history.

(56) References Cited

U.S. PATENT DOCUMENTS

| | | | | |
|---|---|---|---|---|
| 516,793 | A * | 3/1894 | Bassett | E01H 1/056 15/179 |
| 1,935,013 | A | 11/1933 | Burcke | |
| 2,145,738 | A * | 1/1939 | Sandberg | E01H 1/056 15/79.1 |
| 2,246,880 | A | 6/1941 | Erke et al. | |
| 2,270,646 | A | 1/1942 | Campbell | |
| 2,564,352 | A * | 8/1951 | Bjorklund | A01G 1/125 15/79.1 |
| 2,976,939 | A | 5/1956 | Van Der Lely | |
| 3,086,789 | A * | 4/1963 | Kleiman | E01H 1/056 15/79.2 |
| 3,699,755 | A * | 10/1972 | Hauser | A01D 43/102 56/16.4 R |
| 4,398,384 | A * | 8/1983 | Klinner | A01D 43/10 56/14.5 |
| 5,280,696 | A * | 1/1994 | Quataert | A01D 82/00 56/16.4 A |
| 5,540,004 | A * | 7/1996 | Patterson | A46B 13/001 15/55 |
| 5,966,913 | A * | 10/1999 | Neuerburg | A01D 43/102 56/16.4 A |
| 6,360,396 | B1 * | 3/2002 | Chao | E01H 1/105 15/78 |
| 7,322,175 | B2 * | 1/2008 | Ferre | A01D 82/02 241/294 |
| 2008/0109982 | A1 * | 5/2008 | Sandberg | E01H 5/092 15/256.53 |
| 2008/0196909 | A1 * | 8/2008 | Carlsson | A01D 34/835 172/720 |
| 2011/0203062 | A1 * | 8/2011 | Burenga | A46B 13/001 15/88.4 |
| 2014/0123412 | A1 * | 5/2014 | De Bree | A01G 1/125 15/21.1 |
| 2014/0130275 | A1 * | 5/2014 | Peters | A01G 1/125 15/88.4 |
| 2014/0259898 | A1 * | 9/2014 | Jens | A01M 21/02 47/1.43 |
| 2014/0260148 | A1 * | 9/2014 | Jens | A01M 21/02 56/10.2 R |
| 2015/0033589 | A1 * | 2/2015 | McAdam | E01H 5/06 37/231 |
| 2015/0047232 | A1 * | 2/2015 | Kassander | E01H 5/09 37/259 |
| 2015/0075066 | A1 * | 3/2015 | Stowe | A01D 34/015 47/1.3 |
| 2015/0144362 | A1 * | 5/2015 | Thompson | E01H 12/00 171/107 |

FOREIGN PATENT DOCUMENTS

| | | |
|---|---|---|
| DE | 10139989 A1 | 3/2003 |
| DE | 202006017441 U1 | 2/2007 |
| DE | 102009039607 A1 | 3/2011 |
| GB | 549133 | 11/1942 |
| WO | 2014158088 A1 | 10/2014 |

OTHER PUBLICATIONS

Carlsson, Jonas; Weedcutter CombCut; JustCommonSense AB; 2010; <http://www.jcs-innovation.se>.*

Carlsson et al.; JTI is working on with praise weed cutters; Dec. 4, 2012; JTI Institute; <http://www.jti.se/index.php?mact=News2,cntnt01,detail,0&_s=&cntn01articleid=262>.*

International Search Report and Written Opinion of the International Searching Authority for PCT/US2015/012266, Dated May 6, 2015.

John Pawsey, Combcut Review YouTube video, Jun. 14, 2013, accessible at: https://youtu.be/0kschPYTtRM.

Just Common Sense AB, Selective Weedcutter CombCut, YouTube video, Feb. 10, 2014, accessible at: http://youtu.be/W-ITLrjCiVM.

Larsen, et al., Turfgrass Management and Weed Control Without Pesticides on Football Pitches in Denmark, Society of Chemical Industry, Pest Management Science 60: pp. 579-587, 2004.

Dest et al., Differentiating Between the Influence of Wear and Soil Compaction and Their Interaction of Turfgrass Stress; International Turfgrass Society, Research Journal vol. 11, pp. 1067-1083, 2009.

Dest et al., Study: Natural turf use levels; FieldScience, SportsTurf; www.sportsturfonline.com. pp. 8-11, May 2011.

Miller et al., Organic Management Practices on Athletic Fields: Part 1. The Effects on Color, Quality, Cover, and Weed Populations, Crop Science, vol. 52, www.crops.org, pp. 890-903, Mar.-Apr. 2012.

Gaugler, et al., Predictability in Biological Control Using Entomopathogenic Nematodes; Journal of Economic Entomology, May 1991.

* cited by examiner

APPARATUS, SYSTEM AND METHOD FOR MECHANICAL, SELECTIVE WEED CONTROL IN MATURE AND ESTABLISHING CROPS INCLUDING TURFGRASSES

RELATED APPLICATIONS

The present application claims priority under 35 U.S.C. §120 to U.S. Provisional Patent Application No. 61/929,607, filed Jan. 21, 2014, the entire disclosure of which is incorporated by reference.

FIELD OF THE INVENTION

The present invention relates to an apparatus useful in reducing weed pressure and/or improving wear tolerance in crops. For example, an apparatus, system and method is provided to improve turfgrass quality, wear tolerance, reduce weed pressure, and for retaining more turfgrass cover when a turfgrass area is subjected to traffic.

BACKGROUND OF THE INVENTION

As used herein, the term "crop" refers to desirable plants, including, in one aspect of the invention, turfgrasses. Turfgrasses are different from other grasses in three primary ways: turfgrasses can form a dense contiguous community, tolerate frequent mowing and tolerate traffic. Due to these unique qualities turfgrasses are used extensively in our urban culture including golf courses, athletic fields, parks, cemeteries, roadsides and home lawns. Proper turfgrass management is critical to its long-term sustainability and the safety of the playing surfaces where it's utilized. Turfgrass is managed according to five primary cultural practices; 1) mowing, 2) fertilization, 3) cultivation, 4) irrigation and 5) pest control.

While turfgrasses are often grown as part of an athletic field, golf courses and/or lawns, other types of grasses may also comprise a desirable crop plant. For example, grasses may be grown for grazing by cattle. Such grasses may comprise forage grasses, turfgrasses, or a combination thereof. Another example of a crop that may also be grown for harvest is hay.

Pest control employs preventative and/or curative approaches to protecting desirable crop species, such as grasses, from potentially damaging weeds, insects, and/or diseases. Traditionally, turfgrass managers have implemented an Integrated Pest Management (IPM) program to maintain pest populations below threshold levels. The IPM approach allows the judicious use of pesticides to maintain pest populations at an acceptable level to maintain a healthy turfgrass stand. A pesticide is a broad term used to describe any substance that prevents, destroys, repels or mitigates any pest. Pesticides are further categorized according to their intended targets (i.e. herbicides, fungicides, insecticides, etc.). Herbicides, pesticides targeting weeds only, accounted for the highest usage of pesticides in the home and garden sector with 66 million pounds applied in 2007. U.S. Environmental Protection Agency, Pesticides Industry Sales and Usage 2006 and 2007 Market Estimates.

The concern regarding pesticide applications has increased tremendously, particularly where there is potential risk of exposure to children such as lawn areas, athletic fields and parks/playgrounds. The primary concern regarding low, nonacute, repetitive and combined exposures are increased risk of cancer, abnormal neurodevelopment, asthma, perturbation of gestational growth, and endocrine-mimicking effects (US AAP 2012 and Can Fam Phys, 2007). J. R. Roberts, C. J. Karr, Pesticide Exposure in Children, Pediatrics Vol. 130, No. 6 (2012); K. L. Bassil, et al, Cancer Health Effects of Pesticides, Canadian Family Physician, Vol. 53 (2007). These very serious concerns have resulted in pesticide restrictions related to athletic fields in 41 out of 50 states, according to the Sports Turf Managers Association. Connecticut has banned all pesticide applications on school grounds and athletic fields serving grades pre-k through grade 8. There is discussion to expand the scope of this law to high school and public grounds. The state of New York passed the Childs Safe Playing Field Act that essentially bans pesticide use on schools grounds, day care centers and athletic fields through grade 12. Additionally, several municipalities across the U.S. have banned pesticides on parks, open space parcels and public rights of way. This includes 7 states, 18 cities, and 92 parks/playgrounds. Concerns regarding pesticide impacts on human health and the environment have even advanced to the university and college level where some campuses or specific areas of campus have been declared pesticide-free as they embrace more sustainable approaches.

Turfgrass breeding efforts have resulted in improved cultivars of different turfgrass species that have better insect and disease resistance helping to reduce the susceptibility of some turfgrass species. Additionally, entomopathogenic nematodes have been shown to biologically control some of the most damaging root feeding insects. See, Georgis, R., and R. Gaugler, Predictability in biological control using entomopathogenic nematodes. *J. Econ. Entomol.* 84(3):p. 713-720. However, a consistent method of weed control is not available. This leaves many high quality turfgrass areas susceptible to weed infestations on a perennial basis. This is particularly a concern in high traffic areas such as athletic fields where turfgrass cover is continually reduced and opportunistic weeds are able to germinate, develop quickly, and potentially dominate a turfgrass stand in a very short period of time.

Previous research has investigated the effects of utilizing existing equipment such as spring-tine harrows or vertical cutting units to damage weeds and create a competitive advantage for turfgrasses on football pitches. Larsen, S. V., P. Kristoffersen, and J. Fischer, Turfgrass management and weed control without pesticides on football pitches in Denmark. *Pest Manage. Sci.* 60(6):p. 579-587. However, these methods were thought to be too injurious to the established turfgrass resulting in modest weed control and sometimes increased weed pressure.

Research has shown that perennial broadleaf weeds and annual grassy weeds are less traffic tolerant than desirable turfgrass species. Miller, N. A., and J. J. Henderson 2012, Organic management practices on athletic fields: Part 1: The effects on color, quality, cover, and weed populations. *Crop Sci.* 52(2):p. 890-903 and J. T Brosnan et al, Large Crabgrass, White Clover, and Hybrid Bermudagrass Athletic Field Playing Quality in Response to Simulated Traffic, Crop. Sci 54:1838-1843 (2014). Therefore, when intense traffic is applied over time to a turfgrass stand containing perennial broadleaf weeds and annual grassy weeds, the desirable turfgrasses persist and the weeds do not. Traffic is a combination of wear (i.e. tearing and bruising of leaf tissue) and soil compaction (i.e. forcing soil solids closer together). Research has also indicated that when traffic components (wear and compaction) are implemented separately to different areas and their detrimental effects are compared, wear is more detrimental to the quality of vegetative cover than compaction. See, Dest, W. M., J. S. Ebdon, and K. Guillard, Differentiating between the influence of wear and soil compaction and their interaction of turfgrass stress, *Int. Turfgrass Soc. Res. J.* 11 (Part 2) p. 1067-1083.

Weeds substantially reduce the aesthetic quality of turfgrass stands, but most importantly are less traffic tolerant than turfgrasses. Therefore, once weeds dominate an existing turfgrass stand, weeds are unable to persist under the constant traffic and vegetative cover is drastically reduced. Athletic fields with reduced vegetative cover have been linked to higher surface hardness values and increased risk of surface related injuries. See, Dest, W. M., and J. S. Ebdon. Study: Natural turf use levels. Sports Turf. 27(5) p. 8, 10-11 and Brosnan et al. 2014. However, chemical applications, such as selective herbicides, are more likely to be limited on athletic fields.

Accordingly, there is a need for an apparatus, system and method of growing and improving desirable, wear-tolerant plants and reducing undesirable weeds that may compete with this growth. There is further a need for an apparatus, system and method of reducing weeds in turfgrass and other crops without the application of selective herbicides. There is also a need for an apparatus, system and method of producing improved wear tolerance in turfgrass.

SUMMARY OF THE INVENTION

It is an object of the present invention to provide an apparatus, system and method of growing and improving crops (including turfgrasses) and reducing weeds that may compete with this growth and improve wear tolerance.

In one example of the present invention, an apparatus for applying a desired amount of mechanical abrasion to a crop is provided. The apparatus includes a base, a brush and an elevation device for maintaining the base at desirable height. The base has a first longitudinal axis and a plurality of grooves, the grooves being oriented approximately perpendicular to the first longitudinal axis. The brush has a second longitudinal axis and a plurality of bristles and/or blades extending outwardly from the second longitudinal axis. The brush is attached to the apparatus such that the second longitudinal axis is substantially parallel to the first longitudinal axis and the brush is rotatable about the second longitudinal axis. The brush is spaced from the base such that the plurality of bristles engage the plurality of grooves. The base is adjustable enabling the operator to move the base closer or further from the rotating brush/blades.

The elevation device is configured to support the base above the ground but in contact with the crop. The elevation device may comprise any one of several structures, including vertically-adjustable rollers, wheels, skids, and combinations thereof. For example, the elevation device may support the base such that crops and other plants such as weeds are engaged by the plurality of bristles/blades and drawn into the plurality of grooves and/or teeth and/or vertically orientated rotating discs.

In one example, the brush is cylindrical. In another example, rows of bristles may be arranged in a helix. The plurality of bristles will typically exceed the plurality of grooves and/or vertically orientated rotating discs. Also, the bristles are typically smaller in diameter than the width of the grooves and/or vertically orientated rotating discs. The grooves may have a constant width or a tapered width, and may be textured to increase wear. The base may comprise a single, integrated unit or a combination of a base blade mounted on a blade holder, where the grooves are formed on the base blade.

A method of applying a desired amount of mechanical abrasion to desirable plants and undesirable plants is also presented. The method includes periodically applying mechanical abrasion to the desirable plants and the undesirable plants, wherein the level of mechanical abrasion is selected to be damaging to the undesirable plants and substantially within the wear tolerance of the desirable plants. The desirable plants may include turfgrasses and/or forage grasses. The mechanical abrasion may be applied by a rotating cylindrical brush with bristles engaging a base having a plurality of grooves. In one example, the period of applying mechanical abrasion is about once per week. However, the period of application will vary depending on weed pressure, growing conditions, maturity of the desirable plants, etc.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DESCRIPTION OF THE EMBODIMENTS

While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "or" as used herein is to be interpreted as an inclusive or meaning any one or any combination.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein, the term "crop" refers to desirable plants, including desirable grasses, including, but not limited to Kentucky bluegrass, perennial ryegrass and combinations thereof, forage grasses, hay, etc. The term "weed" refers to undesirable perennial, biennial and/or annual plants, including broadleaf (dicotyledonous) and grassy (monocotyledonous) species. As used herein the term "traffic" refers to a combination of wear (i.e. tearing and bruising of leaf tissue) and soil compaction (i.e. forcing soil solids closer together) of the turfgrass. As used herein the term "wear tolerance" refers to the ability of plants, including but not limited to desirable grasses, to withstand aggregate, repeated stresses of damage to above ground plant material over a period of time.

Figure 1:
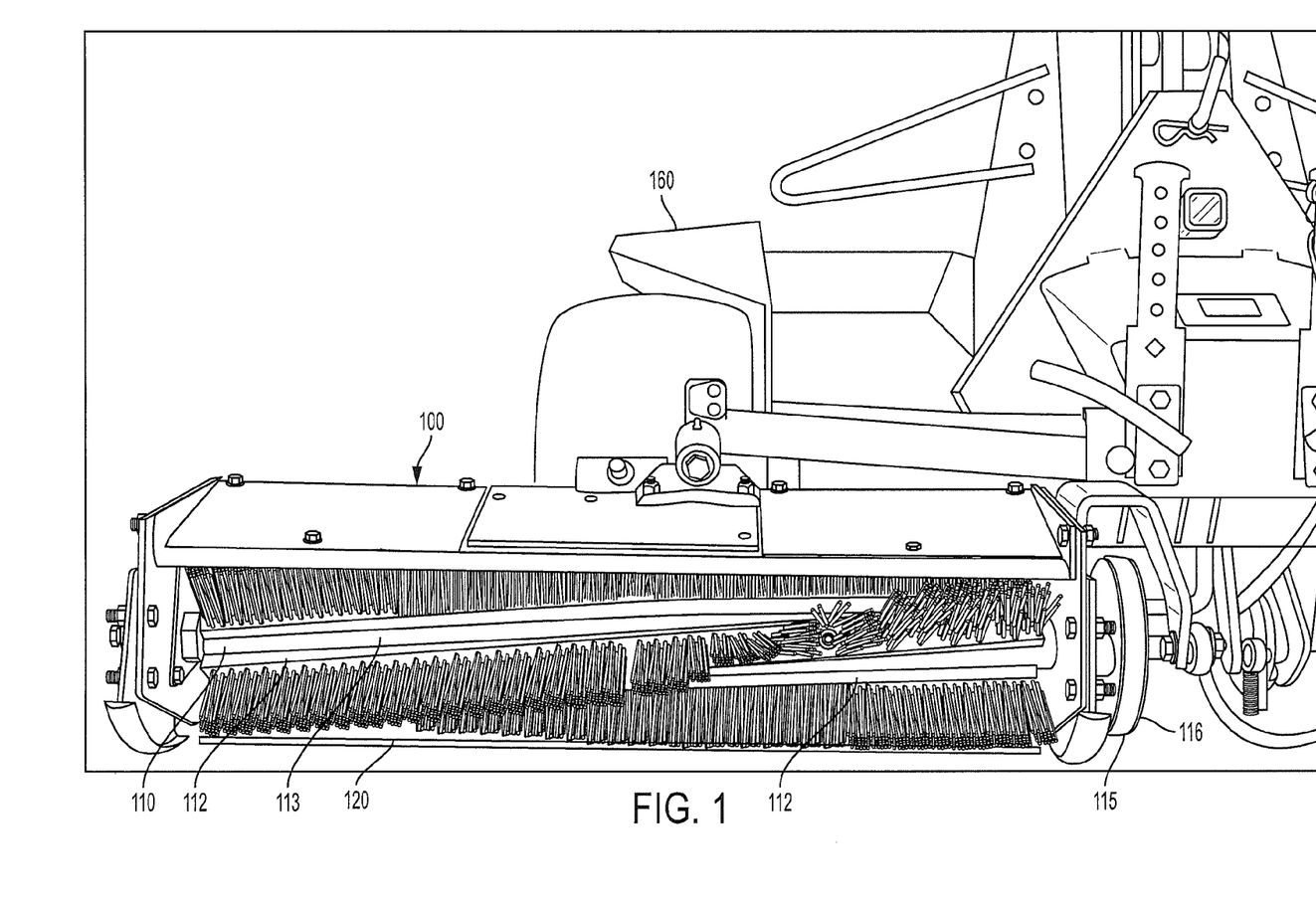
FIG. 1 illustrates a front view of an apparatus according to one example of the present invention, the apparatus being attached to a conventional mower.
Figure 2:
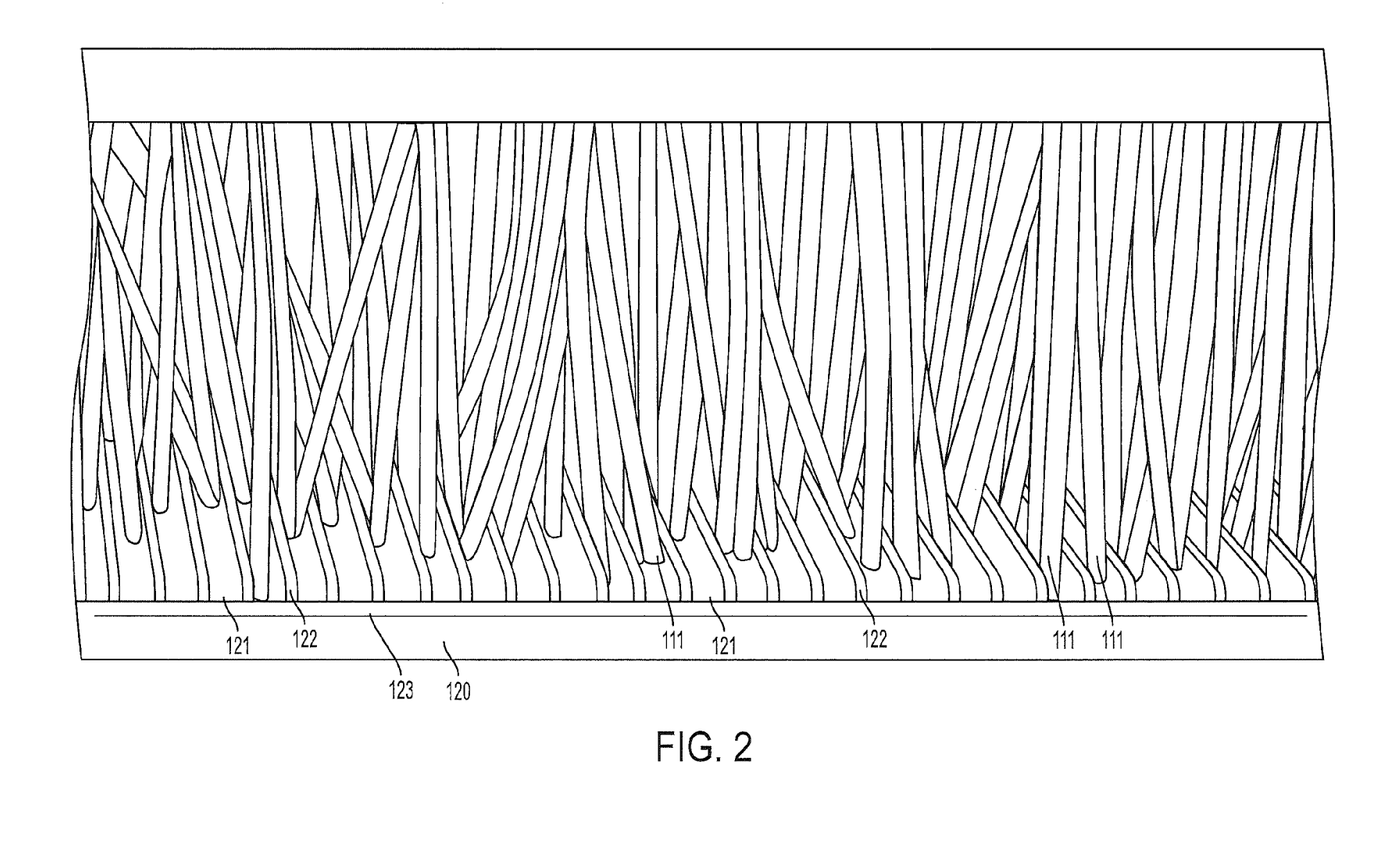
FIG. 2 is an enlarged view of a portion of the apparatus of FIG. 1.
Figure 3:
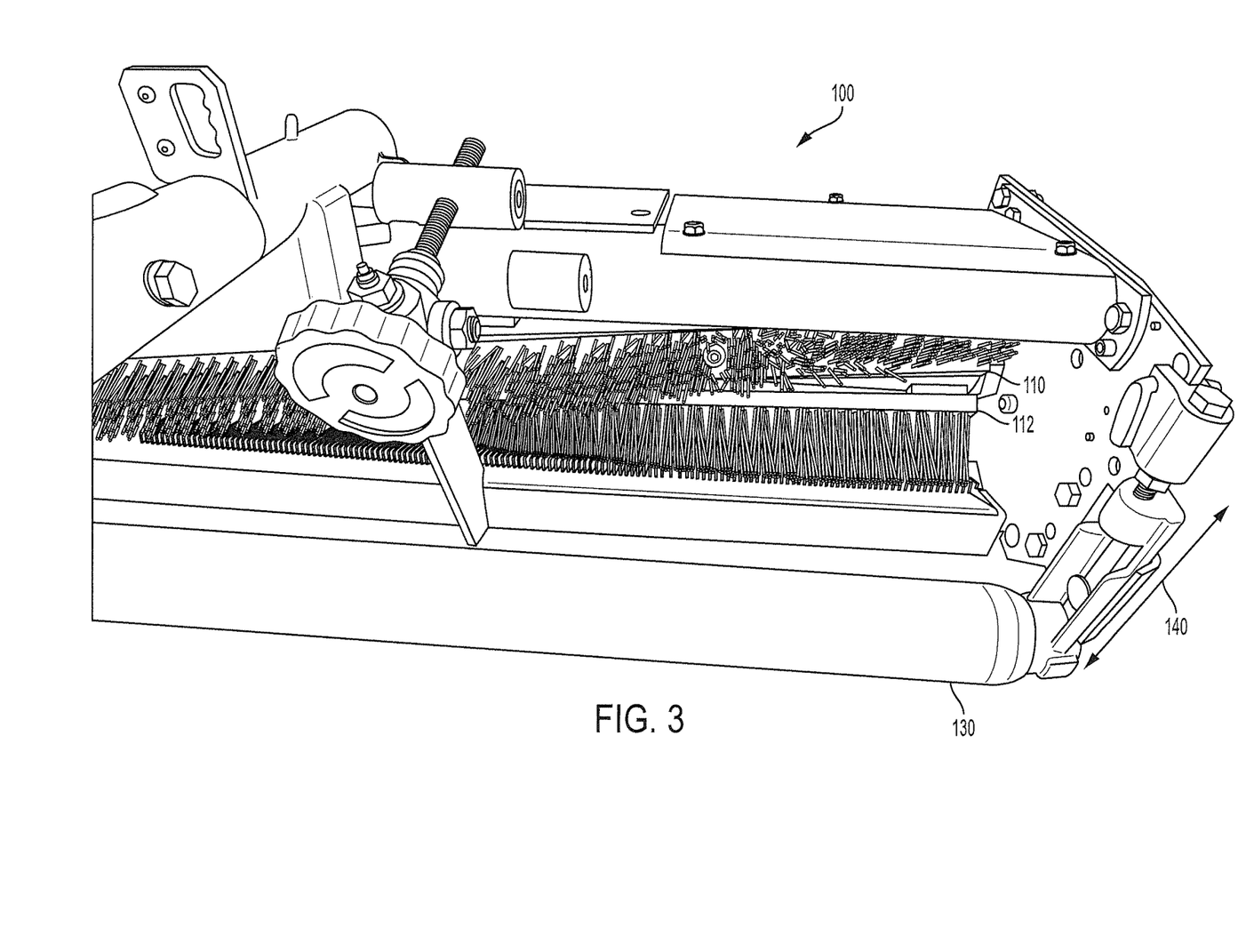
FIG. 3 is a rear view of the apparatus of FIG. 1.

As is illustrated in the accompanying FIGS. 1-4, an example of the present invention is generally shown as apparatus 100 for operating on desirable turfgrasses and undesirable weeds. In particular, the present invention provides an apparatus, system and method of reducing weed pressure on desirable turfgrasses. Apparatus 100 has a cylindrical brush 110; a grooved base 120 and a roller 130 (FIG. 3). Roller 130 is an elevation device, may be configured to be adjustable in a vertical direction 140 to control the height of the base 120. In FIG. 1, the apparatus 100 is illustrated as being used in conjunction with a ride on mower 160, which may provide power to rotate the cylindrical brush 110 and propel the apparatus 100 across a surface, such as a an athletic field.

Referring to FIG. 1 the cylindrical brush 110 may be configured, for example in a width of approximately 70 cm and have a 17 cm diameter. The cylindrical brush 110 may be comprised of a plurality of separate rows. In the example illustrated in FIGS. 1-3, four rows 112 of brushes are used, each being installed on an axle with a 90 degree twist to form a helix. Other numbers of rows may also be used with appropriate adjustments in the amount of twist on each row of brushes. Each row 112 can be comprised of a plurality of nylon bristles 111 each being approximately 1.5 mm diameter and having a 5 cm pile height. In the illustrated example, bristles 111 are the same size, however, bristles of varying diameters may be included in brush 110. Bristle tips may be cut or rounded. Also, to further optimize the level of mechanical wear, the bristles may be smooth, textured or micro notched in the vertical or horizontal plane. In cases where weeds are especially hardy, metal blades may also be included on the brush 110. The blades may be shorter than the bristles, and the bristles would help bring the weeds into engagement with the base blade. While a plurality of staples of flexible bristles are a preferred example of a brush, the terms "brush" and "bristles" as used herein may also include any protrusions (e.g., tines, nubs) configured to impart selective tearing and/or bruising of leaf tissue.

The rows 112 are mounted on a shaft 113, which is supported by bearings on either end of apparatus 100. The rows 112 of the bristles 111 can be configured in a helicoid (a spiral shape around an axis or cylinder). The arrangement of the bristles 111 and rows 112 allow vegetation or plant material to enter the apparatus 100 and be subjected to the rotating bristles 111. The bristles 111 force the plant material into grooves 121 of the base 120. The grooves 121 of the base 120 are designed to: 1) assist the bristles/blades to grasp the undesirable plants and completely remove the plants from the ground (including the roots), 2) increase pressure on the leaf tissue/stem to promote tearing and bruising from bristle action and/or 3) completely remove the leaf from the stem. Repeated applications at key points during the growing season exhausts the carbohydrate reserves of the undesirable plants, leading to plant death.

Finally, roller 130 provides variable height of operation and maintains a desired height 140 of the base 120 during operation. Other elevation devices may also be used, including wheels, skids, segmented rollers, and combinations thereof. It is preferable, but not necessarily required, for the elevation device to include a mechanism for adjusting the height of the base.

Figure 6:
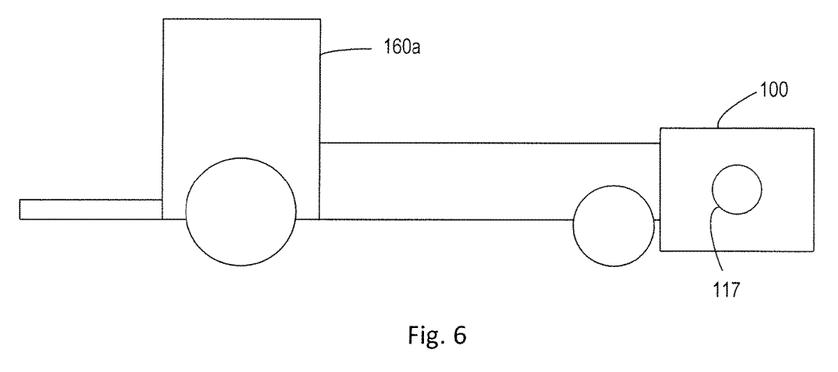
FIG. 6 illustrates a front view of an apparatus according to another example of the present invention, the apparatus being attached to a conventional ride behind mower.

This apparatus can have multiple configurations to implement this method of weed control. Configuration examples are as follows; Stand-alone configurations include self-propelled walk-behind and ride-on units. The apparatus 100 can be used concurrently with a mower (i.e. two separate pieces of equipment operated independently) (not shown) or as an integrated part configured as a mower attachment, mounted in front (FIG. 1, FIG. 6), mid-section or rear of an existing mower 160, 160a. This includes ganged units, self-powered pull-behind units, and power take off driven, three point hitch mounted or pull-type units for tractors. Alternatively, the integrated part can be designed integral as part of the mower or mower deck. In this embodiment, the frame of the apparatus is configured to hold the cylindrical, brush 110 enabling the brush 110 and bristles 111 to rotate and interact with the grooved base 120 so as to impart wear on plant material, such as weeds and turfgrasses. In one example of the invention, the brush rotates. In other examples, the brush may engage in a reciprocating motion. As illustrated in FIG. 1, a belt 115 may drive a pulley 116 which is attached to the shaft 113. Alternatively, as illustrated in FIG. 6, the shaft 113 may be driven hydraulically 117. The shaft 113 may also be driven by wheels through a gearset as is known with reel-type mowers.

Figure 8:
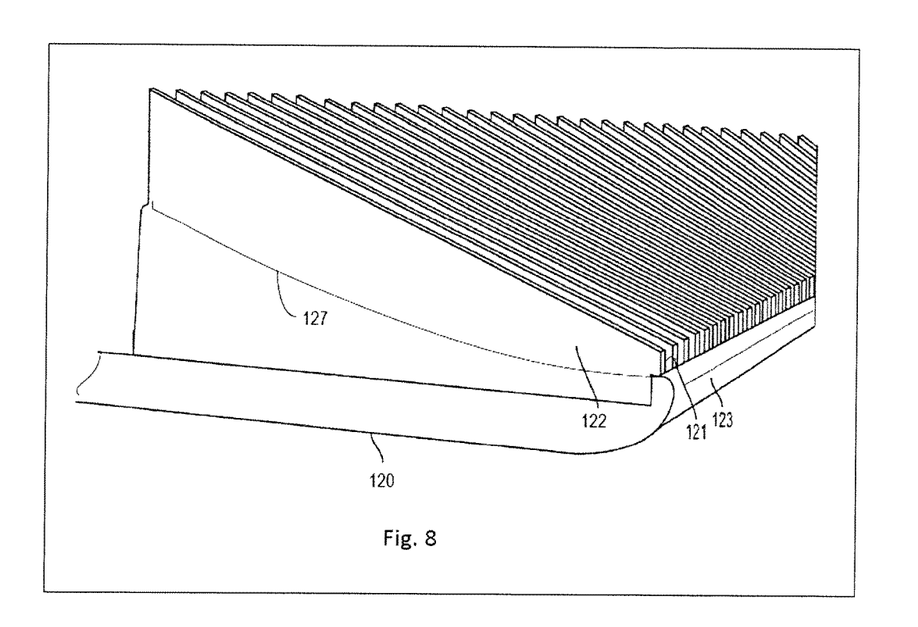
FIG. 8 illustrated another groove configuration according to another aspect of the present invention.

FIG. 2 illustrates a view of how the bristles 111 interact with the grooves 121. The bristles have a diameter which is smaller than the opening of the grooves, so the bristles may pass through the grooves without binding or popping out of the grooves. However, the bristles 111 are not precisely aligned with the grooves 121, and enter the grooves at slight angles to the grooves. The bristles 111 consequently rub along the sidewalls 122 of the grooves 121 and/or top edges of the grooves. In one example, the bristles are dimensioned to rub along at least a portion of the bottoms of the grooves 121 as well. One or more bristles 111 enter the grooves 121 in a semi-loose state with the plants such as a weed species and/or turfgrass. As the bristles 111 and the smaller weeds (containing leaflets) progress through the grooves 121, the bristles 111 damage leaves and/or stems of undesirable broadleaf plants by abrading them against the sidewalls 122 of the grooves 121 and/or bottom of the grooves 121. For weed species with broader leaf morphology, the action of the bristles 111 and grooves 121 will interact to tear and bruise leaf tissue. Some weed species may be completely removed from the soil. For example, crabgrasses have been observed to be engaged by the bristles and grooves and be uprooted. However, thinner grass leaves experience less abrasion from the apparatus 100 and are more tolerant of abrasion. In this respect, the mechanical abrasion of the present invention is not the same as mowing (which cuts all plants equally) or vertical cutting (which is damaging to turfgrass). In one example, grooves 121 can be configured to have a depth of 6 mm. In another example (FIG. 8), the depth 127 of the grooves 121 increases and/or decreases as the bristles move through the grooves 121.

Figure 7:
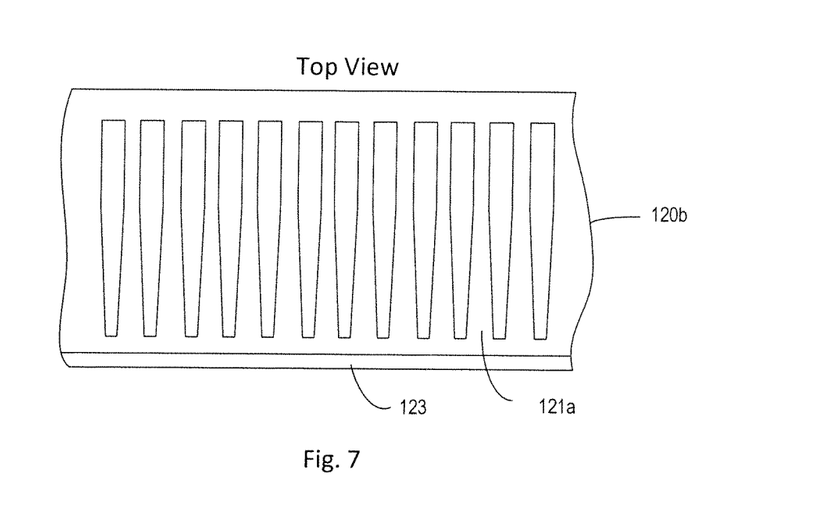
FIG. 7 illustrates a groove configuration according to another aspect of the present invention.

The base 120 containing grooves 121 can be configured so that the first portion is a lip 123, for example, approximately 3 cm. Preferably, lip 123 is smooth, so that desirable crops may slide off the base after being engaged by the bristles. In a first example, the grooves 121 have a uniform width. In a second example (FIG. 7), the grooves 121a of the base 120b taper from a width of 8 mm to a width of 4 mm. The grooves may be formed when casting the base 120, by cutting notches into base 120, by welding fins onto base 120, or by other methods. The grooves 121 may be various widths and lengths, so long as they cooperate with the brush 110 to apply mechanical wear to plants. In another example, the grooves may include sharpen or serrated teeth to increase mechanical tearing of leaves. In another example, the base 120 may include counter-rotation slicing discs interspersed between and parallel with the grooves 121. The slicing disks counter rotate with the brush 110 to rip weed leaves and pull weeds out of the soil.

Figure 4:
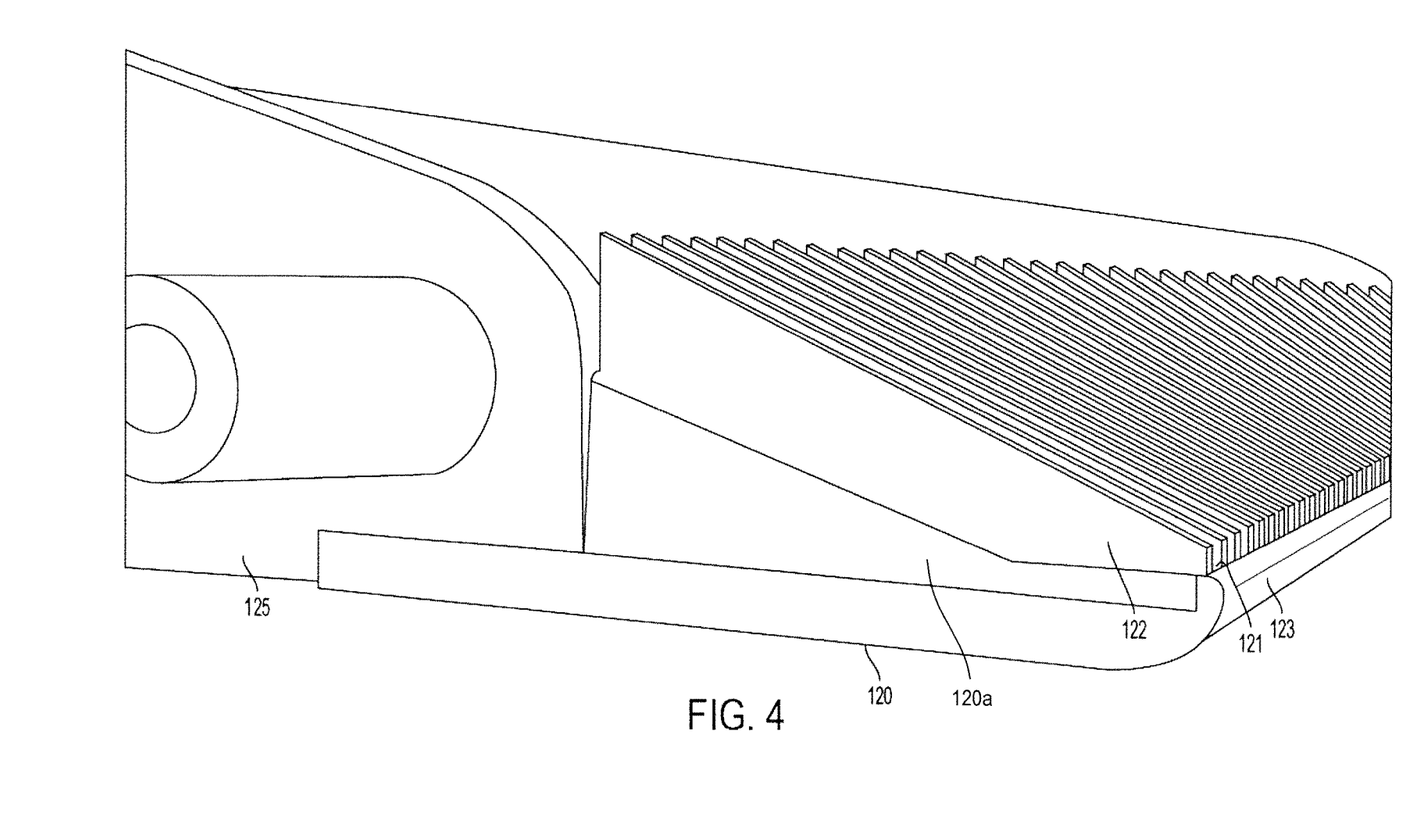
FIG. 4 is a view of a base blade and blade holder of the apparatus of FIG. 1.
Figure 5:
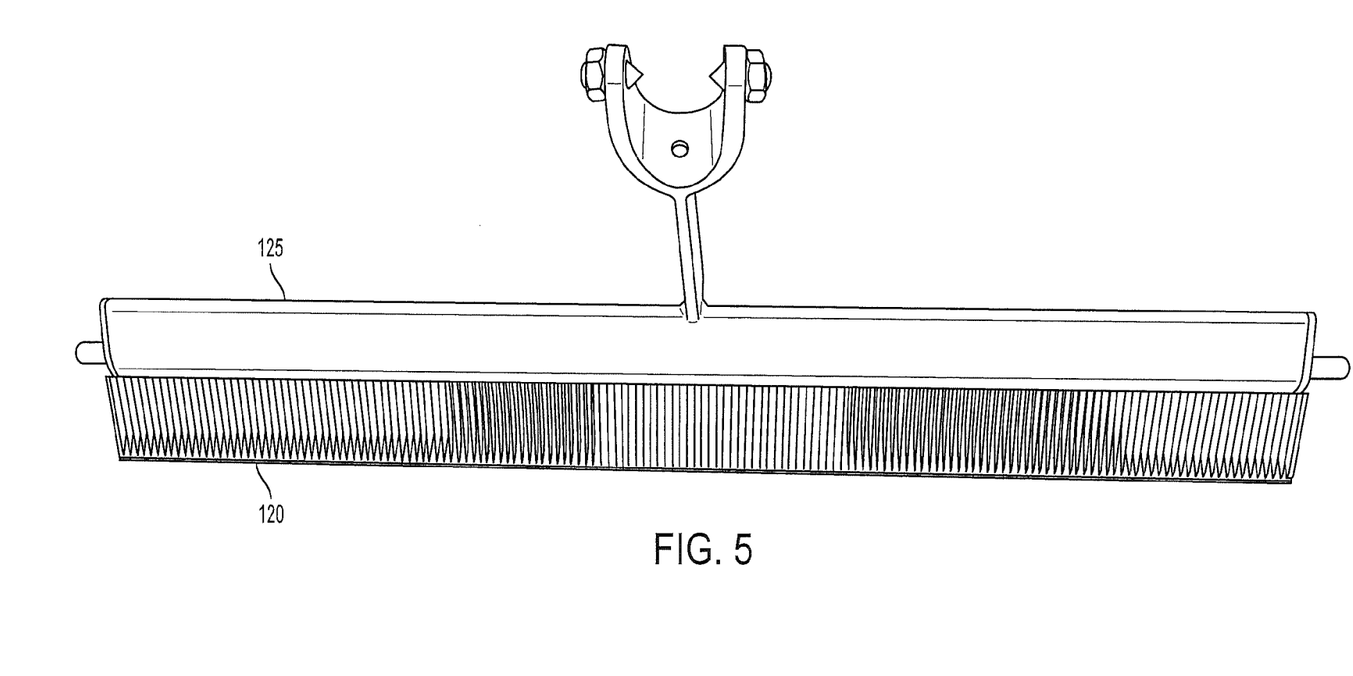
FIG. 5 is an alternate view of a base blade and blade holder of the apparatus of FIG. 1.

In the example illustrated in FIGS. 4 and 5, the base 120 comprises a base blade 120a, which contains the grooves 121, and a blade holder 125, on which the base blade 120a is mounted. This allows base blade 120a to be replaced if necessary, without replacing the entire base. In another example, the base 120 is a unitary structure with the grooves 121 integrally formed thereon. In another example, the base may be concave, so that the bristles maintain a consistent distance from the grooves.

A prototype has been developed, and results from trials show that routine use on established turfgrass stands creates an environment favorable for obtaining results of desirable turfgrasses stands and detrimental to the most troublesome weed species in cool-season turfgrasses.

A first study involved the use of the apparatus on Kentucky bluegrass. This is the predominate species utilized on athletic fields and home lawn mixtures where cool-season grasses are utilized. The study included three treatments: 1) Weed Defoliator/Extractor once per week, 2) chemical herbicide, and 3) an untreated control, with two replications. Clover populations were evaluated qualitatively utilizing a scale of 0-100% weed cover, prior to treatment applications. Plots were treated with the Weed Defoliator/Extractor and mowed immediately following, simulating the Weed Defoliator/Extractor device being incorporated into a mower deck. Plots were qualitatively assessed six weeks later following seven treatments with the Weed Defoliator/Extractor device. Percent clover control was calculated using the Henderson-Tilton formula which utilizes pretreatment weed populations, post treatment weed populations and weed populations in the untreated control. Analysis of variance was used to test for significant ($P \leq 0.05$) differences between treatments. Mean separations were conducted using Fisher's least significant difference test with a 0.05 probability level. Treatments with the same letter are not significantly different. The apparatus of the present invention successfully controlled over 70% of the clover (significantly more than the untreated control). The chemical weed control treatment was applied after the last rating date to maximize efficacy. However, the efficacy of the chemical treatment will likely be 100%.

A second study was conducted on perennial ryegrass and was designed to look more closely at how to best utilize the Weed Defoliator/Extractor device in terms of frequency. Perennial ryegrass is another species heavily utilized on athletic fields and in home lawn mixtures. The study included six treatments; 1) Weed Defoliator/Extractor once per week, 2) Weed Defoliator/Extractor twice per week, 3) Weed Defoliator/Extractor biweekly, 4) as needed, 5) chemical herbicide, and 6) untreated control with three replications. Clover populations were evaluated qualitatively utilizing a scale of 0-100% weed cover, prior to treatment applications. Plots were treated with the Weed Defoliator/Extractor and mowed immediately following. Plots were qualitatively assessed six weeks later. Percent clover control was calculated as described above. These results show that Weed Defoliator/Extractor treatments applied once per week were most effective for reducing the clover populations. Applied once per week, Weed Defoliator/Extractor treatments controlled over 98% of the clover (significantly more than the untreated control). The chemical weed control treatment was applied after the last rating date to maximize efficacy. However, the efficacy of the chemical treatment will likely be 100%.

The present invention produces an environment advantageous for the monocotyledonous morphology of desirable grasses by imposing a uniform, modest level of wear. The apparatus 100 is configured to provide minimal disturbance to the existing grass stand and damage only the weeds. Additionally, this apparatus 100 does not disturb the soil surface, unlike spring-tine harrows or vertical cutting units of the prior art that have disadvantages of exposing additional weed seed that can potentially germinate and compete with the grass. The apparatus 100 can also be used to manage weed populations in other turfgrass areas or cropping systems.

Accordingly, the method of the present invention creates an environment where turfgrasses are able to persist and where weeds are not able to persist. For example, the morphology of broadleaf weeds makes them more vulnerable to the action of the apparatus of the present invention; whereas desirable turfgrasses are not unduly adversely affected. Leaves of weeds are much wider and often times more succulent than turfgrasses. The apparatus of the present invention, based on these morphological differences, damages weeds more than turfgrasses. The damaged weeds require regeneration, re-growing and/or rejuvenation thereby allowing the less damaged turfgrasses to grow and thrive in the place of weeds.

More specifically, once the leaf tissue of the weed species is damaged its ability to absorb the suns energy to produce carbohydrates through the process of photosynthesis is greatly reduced or eliminated. As the apparatus 100 of the present invention is used, the weed leaf tissue is damaged or removed with repeated and regular use. The weed will need to rely on carbohydrate reserves in the root system for recovery and growth. This reserve supply will eventually be exhausted, leading to plant death.

In operation, the apparatus 100 can be used routinely with mowing. The apparatus 100, nonetheless, can be employed separately as well as a self-propelled walk behind or ride on unit. In one embodiment the apparatus 100 is used concurrently with mowing such as, for example, as an integrated part configured as a mower attachment, mounted in front, mid-section or rear of an existing mower. This includes ganged units, self-powered pull-behind units, and power take off driven, three point hitch mounted or pull-type units for tractors. Alternatively, the integrated part can be designed integral as part of the existing or newly designed mower deck.

While certain configurations of structures have been illustrated for the purposes of presenting the basic structures of the present invention, one of ordinary skill in the art will appreciate that other variations are possible which would still fall within the scope of the appended claims. For example, the direction of rotation of the second longitudinal axis, orientation of the base blade, variations in the geometries of the brush and its bristles and/or other protrusions to impart wear, depth and/or width of grooves and/or rotating vertically oriented slicing discs, spacing between brushes/knives, number and dimension of bristles/knives and grooves/rotating vertically oriented slicing discs, are contemplated. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for applying a desired amount of selective mechanical weed control on plants growing from a surface, comprising:
   a. a base having a first longitudinal axis and further comprising a plurality of grooves, the grooves being oriented approximately perpendicular to the first longitudinal axis;
   b. a brush having a second longitudinal axis and a plurality of bristles extending outwardly from the second longitudinal axis, the brush being rotatably mounted to the apparatus such that the second longitudinal axis is substantially parallel to the first longitudinal axis and the brush is rotatable about the second longitudinal axis; and
   c. an elevation device for maintaining the base at a height above the surface and within contact of the plants;
   wherein the brush is mounted to the apparatus with a spacing from the base such that the plurality of bristles engage the contacted plants within the plurality of grooves.

2. The apparatus of claim 1, wherein elevation device maintains the base at a height above the surface such that the plants are engaged by the plurality of bristles and drawn into the plurality of grooves.

3. The apparatus of claim 1, wherein the elevation device comprises an adjustable height roller that is in contact with the surface and maintains the base at the height above the surface.

4. The apparatus of claim 1, wherein a number of bristles engaging the base at any given time exceeds the plurality of grooves.

5. The apparatus of claim 1, wherein the plurality of bristles have at least one first diameter and the grooves have at least one width, wherein the at least one first diameter is smaller than the at least one width.

6. The apparatus of claim 5, wherein a width of the plurality of grooves is constant.

7. The apparatus of claim 5, wherein a width of the plurality of grooves is tapered to narrow from front to back.

8. The apparatus of claim 1, wherein the brush comprises a cylindrical brush, and the cylindrical brush further comprises an axle;
   and the axle is configured to be coupled to a motor.

9. The apparatus of claim 1, wherein the base comprises:
   a base blade; and
   a blade holder; and
   wherein the base blade includes said plurality of grooves.

10. The apparatus of claim 1, wherein the brush further comprises a plurality of rows of brushes arranged in a helix.

11. A mower comprising: an apparatus in accordance with claim 1.

12. The apparatus of claim 1, wherein the base is concave in a direction perpendicular to the first longitudinal axis.

13. The apparatus of claim 1, wherein the plurality of grooves further comprises a plurality of vertical sidewalls; and
   the bristles abraid the plants against the sidewalls.

14. The apparatus of claim 1, wherein each of the plurality of grooves further comprises two sidewalls and a bottom.

15. The apparatus of claim 14, wherein the bottoms of the grooves are concave.

16. The apparatus of claim 1, wherein the bristles abraid the plants against the base.

17. A method of applying a desired amount of mechanical abrasion to desirable and undesirable plants for weed control using the apparatus of claim 1, comprising:
   applying mechanical abrasion to the desirable plants and the undesirable plants at periodic intervals;
   wherein the level of mechanical abrasion is selected to be damaging to the undesirable plants and substantially within a wear tolerance of the desirable plants.

18. The method of claim 17, wherein the desirable plants comprise turfgrasses.

19. The method of claim 17, wherein the desirable plants comprise forage grasses.

20. The method of claim 17, wherein the mechanical abrasion is applied by the rotating cylindrical brush with bristles engaging the base having the plurality of grooves.

21. The method of claim 17, wherein the period of applying mechanical abrasion is about once per week.

22. The method of claim 17, wherein the period of applying mechanical abrasion is varied to adjust for weed pressure.

* * * * *